US005610743A

United States Patent [19]
Tsai

[11] Patent Number: 5,610,743
[45] Date of Patent: Mar. 11, 1997

[54] LIQUID CRYSTAL DISPLAY INCLUDING CONCENTRIC SHAPES AND RADIAL SPOKES WHICH HAS AN IMPROVED VIEWING ANGLE

[75] Inventor: Meng-Jin Tsai, Hsinchu-Hsien, Taiwan

[73] Assignee: United Microelectronics Corporation, Hsin-Chu, Taiwan

[21] Appl. No.: 549,866

[22] Filed: Oct. 30, 1995

[51] Int. Cl.$^6$ ............................................. G02F 1/1337
[52] U.S. Cl. .......................... 349/124; 349/128; 349/129
[58] Field of Search ............................. 359/75, 76, 78, 359/95

[56] References Cited

U.S. PATENT DOCUMENTS

| | | | |
|---|---|---|---|
| 5,107,356 | 4/1992 | Castleberry | 359/93 |
| 5,124,824 | 6/1992 | Kozaki et al. | 359/73 |
| 5,249,070 | 9/1993 | Takano | 359/54 |
| 5,434,687 | 7/1995 | Kawata et al. | 359/78 |

*Primary Examiner*—William L. Sikes
*Assistant Examiner*—Ron Trice
*Attorney, Agent, or Firm*—William H. Wright

[57] ABSTRACT

A liquid crystal display having an improved angular distribution for emerging radiation is described, together with a method for manufacturing it. This was achieved by forming patterns, one per pixel, of concentric annuli in one of the orientation layers and radial spokes in the other orientation layer. This guarantees that there is a wide range in the orientations of the twisted nematics, leading to an improved angular distribution for the emerging radiation. The invention is applicable to both monochrome as well as color displays and may also be used as a way to adjust, during manufacturing, the angular distribution of the emerging light.

21 Claims, 6 Drawing Sheets

LIQUID CRYSTAL DISPLAY INCLUDING CONCENTRIC SHAPES AND RADIAL SPOKES WHICH HAS AN IMPROVED VIEWING ANGLE

BACKGROUND OF THE INVENTION (1) Field of the Invention

The invention relates to the general field of Liquid Crystal Displays, more particularly to the angular distribution of the light emerging from such displays.

(2) Description of the Prior Art

Figure 1A:
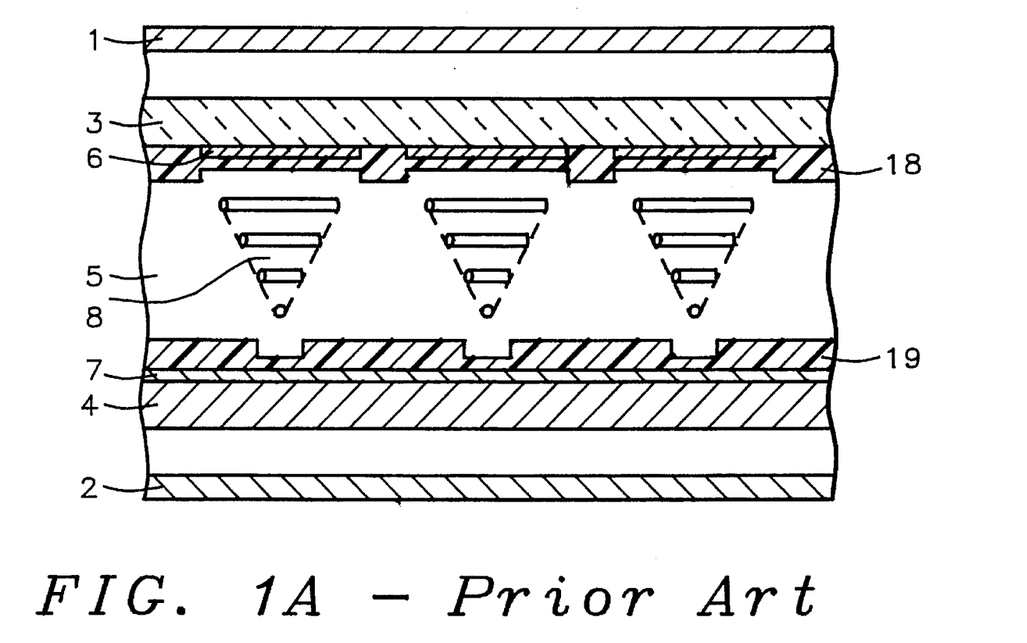
FIG. 1a is a schematic cross-sectional view of a Liquid Crystal Display as described in the prior art.

Referring to FIG. 1a, the basic parts of a liquid crystal display are schematically illustrated in cross-section. A number of layers are involved, the outermost being a pair of light polarizers, entrance polarizer 1 and exit polarizer 2. In their most commonly used configuration, the polarizers are arranged so as to have their optic axes orthogonal to one another. That is, in the absence of anything else between them, light passing through the entrance polarizer would be blocked by the exit polarizer, and vice versa.

Immediately below the entrance polarizer is an upper transparent insulating substrate 3 (usually glass) and immediately above the exit polarizer is a similar lower substrate 4. Transparent conducting lines 6 and 7, usually comprising indium tin oxide (ITO) run orthogonal to one another and are located on the lower surface of 3 and the upper surface of 4, respectively. Lines 6 run perpendicular to the plane of FIG. 1a while lines 7 run parallel to it.

Sandwiched between, and confined there by means of suitable enclosing walls (not shown), is a layer of liquid crystal 5 such as, for example, twisted nematic (TN) or super twisted nematic (STN) liquid crystal molecules. The orientation of these molecules, relative to a given surface can be controlled by coating such a surface with a suitable orientation layer (18 and 19 in FIG. 1a) and rubbing said orientation layer in the desired direction just prior to bringing it into contact with the liquid crystals.

Thus, in FIG. 1a, the molecules closest to upper substrate 3 have been oriented so as to lie in the plane of the figure while the molecules closest to lower substrate 4 have been oriented to lie perpendicular to this plane. Molecules in between the two sets of pre-oriented molecules then arrange themselves so as to gradually change their orientations between these two extremes. Hence the term 'twisted nematic' (TN) for such a configuration. A TN is optically active and will rotate the plane of any polarized light that traverses it.

Thus, polarized light that was formed and oriented as a result of passing through entrance polarizer 1 will be rotated though an angle of 90° after traversing layer 5 and so will be correctly oriented to pass through exit polarizer 2. Such a device is therefore normally on (transmits light).

An important property of TN is that, in the presence of an electric field (typically about 1,000 volts/cm.), normal to the the molecules, said molecules will all orient themselves so as to point in the same direction and the liquid crystal layer will cease to be optically active. By using orthogonal lines as electrodes for said electric field it becomes possible to confine such a field to the intersection of any given pair of these lines. Such an intersection, where lines 6 and lines 7 overlap, then constitutes a single pixel of the display.

Figure 1B:
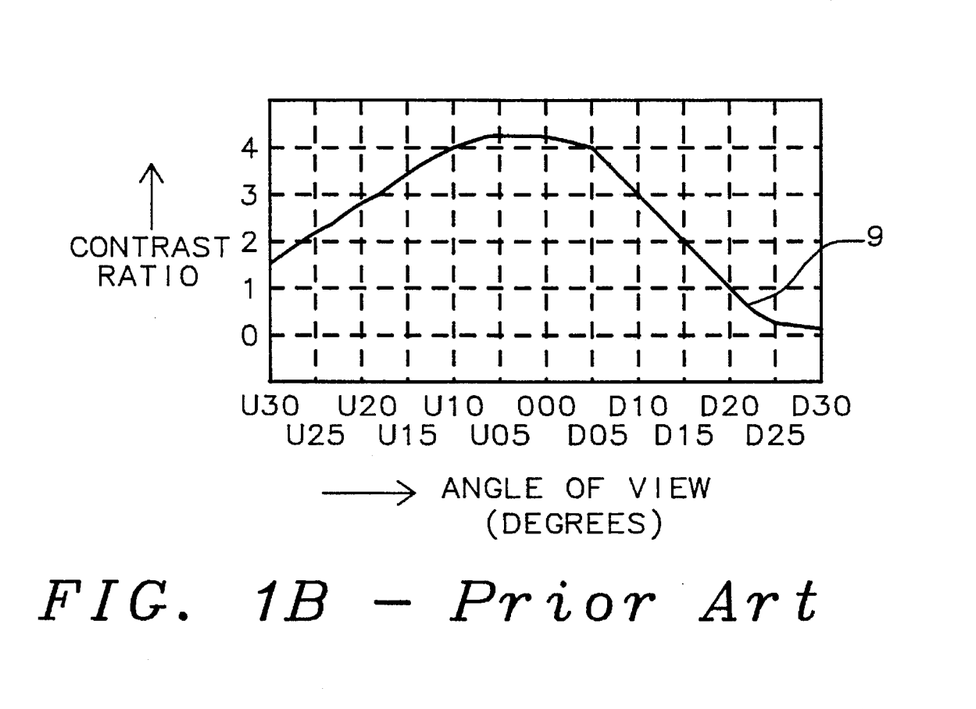
FIG. 1b shows prior art data relating contrast ratio to angle of view.

To view a display of the type illustrated in FIG. 1a, light may be applied from above polarizer 1 and then viewed from below polarizer 2 or a reflecting surface may be applied to the lower surface of polarizer 2 and the device viewed from above polarizer 1. In either case, the exiting light tends to be largely orthogonal to the surface of 1 and the brightness of the display falls off rapidly as the viewing angle increases. As an example of this see curve 9 in FIG. 1b which is taken from some prior art data of Kozaki (see below). Using an arbitrary contrast ratio scale, it is seen that the observed brightness of the display is at a maximum at normal, or close to normal, viewing angles, and falls off rapidly for viewing angles greater than about 15°, going to zero for a viewing angle of 30° when the display is viewed in a downward direction and about 50° (extrapolated) when the display is viewed in an upward direction. Note that this asymmetry in the viewing angle curves is a consequence of the fact that all TNs are oriented in the same direction at the two orientation surfaces, 18 and 19.

A number of approaches to improving the viewing angles of liquid crystal devices have been described in the patent literature. For example, Kozaki et al. (U.S. Pat. No. 5,124,824 Jun 1992), referred to above, teach that an improvement in viewing angle may be achieved by means of a retardation compensation layer, optionally used in conjunction with a phase difference cancellation film. This allows the absolute brightness of the display to be increased, including the portions that emerge at an oblique angle.

Castleberry (U.S. Pat. No. 5,107,356 Apr 1992) uses, in addition to polarizers, birefringent films that convert the linearly polarized entering light to elliptically polarized light, said process being reversed when light exits the display. This results in an improved contrast ratio between the on and off states in all directions, including the oblique.

Takano (U.S. Pat. No. 5,244,070 Sep 1993) modifies the composition of the liquid crystal material through the addition of a chiral dopant. This causes groups of molecules in the TN to exhibit, in roughly equal proportions, both right-handed and left-handed twists. As a result, in this device, the curve of FIG. 1b becomes symmetrical and the viewing angle distribution curve has the values normally associated only with upward viewing (in FIG. 1b) for both directions.

Note that Takano mentions the possibility of covering the entire panel with a single Fresnel lens as a possible way to improve the angular distribution of the emerging light but dismisses this as too expensive as well as disagreeable from the point of view of viewing comfort.

SUMMARY OF THE INVENTION

It is an object of the present invention to provide a Liquid Crystal Display capable of being viewed from angles significantly removed from normal to the display surface.

A further object of the present invention is to provide a cost effective method for manufacturing such a display.

Yet another object of the present invention is to provide said improved viewing angle capability in a manner that is transparent to the user and is not disagreeable with respect to viewing comfort.

A still further object of the present invention is to provide a method for adjusting, during manufacturing, the angular distribution of light emerging from a Liquid Crystal Display.

All of the above objects apply to both monochrome as well as color displays.

These objects have been achieved by forming patterns in the orientation layer, one per pixel, of concentric annuli and radial spokes, one set on the upper orientation layer and the second set on the lower orientation layer. This results in a wide range of initial orientation directions for the molecules that contact the orientation surfaces, thereby removing all possible asymmetry in the output distribution.

A parallel venetian blind provides a useful analogy for visualizing the above. Normally the viewing angle is very limited (prior art LCD) but if the blind has a concentric circle or radial spokes shape it can be viewed from any angle (the present invention). In conventional LCDs the rubbing directions on the orientation surfaces are like the venetian blinds and lead to limited viewing angle. The use of concentric ring and radial line pairs for rubbing is analogous to the circular and radial venetian blinds and form the heart of the present invention.

DESCRIPTION OF THE PREFERRED EMBODIMENTS

Figure 2:
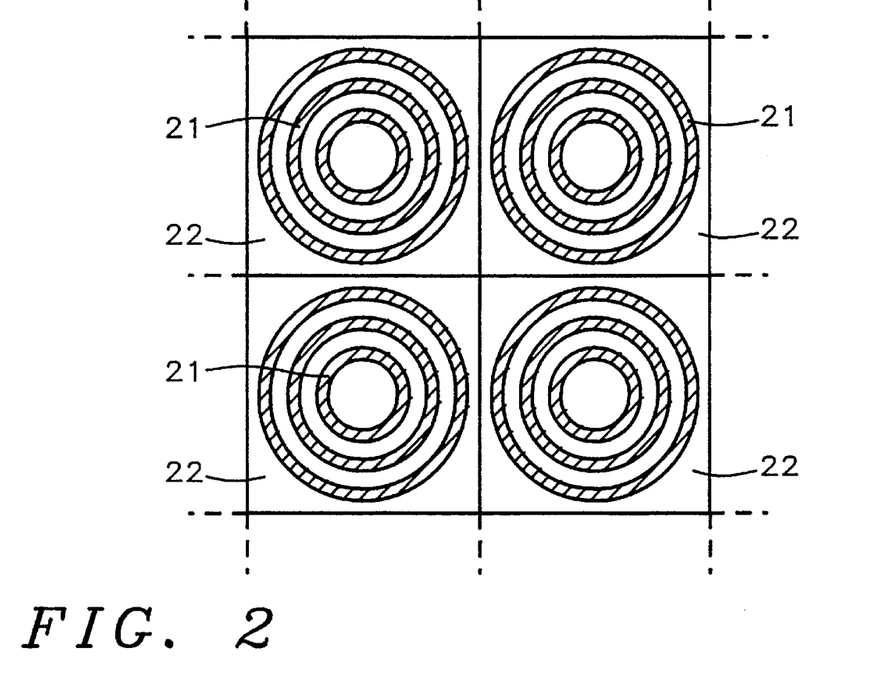
FIGS. 2 and 3 show patterns of concentric annuli and radial spokes, respectively.
Figure 3:
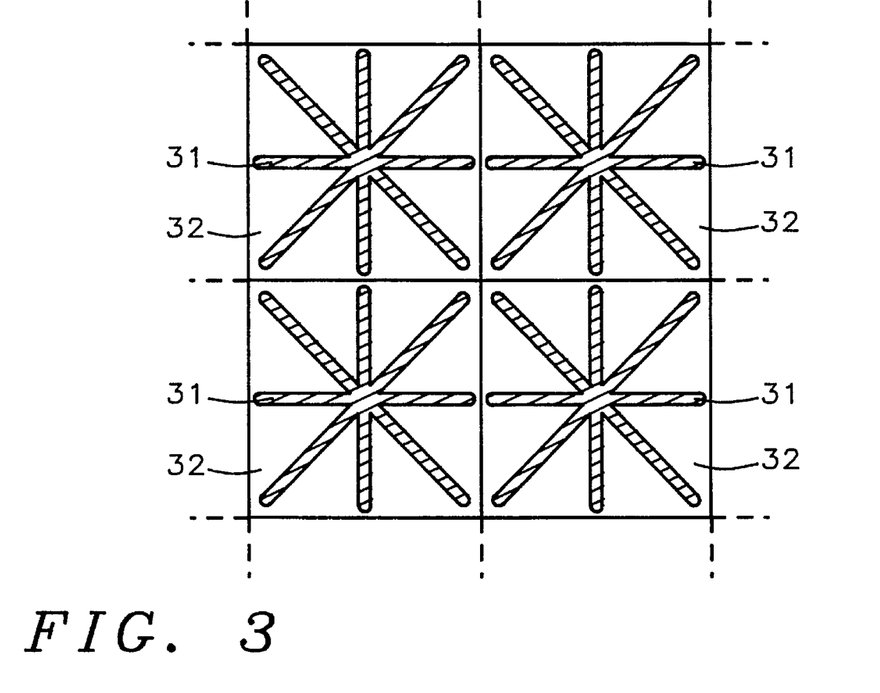
Figure 6:
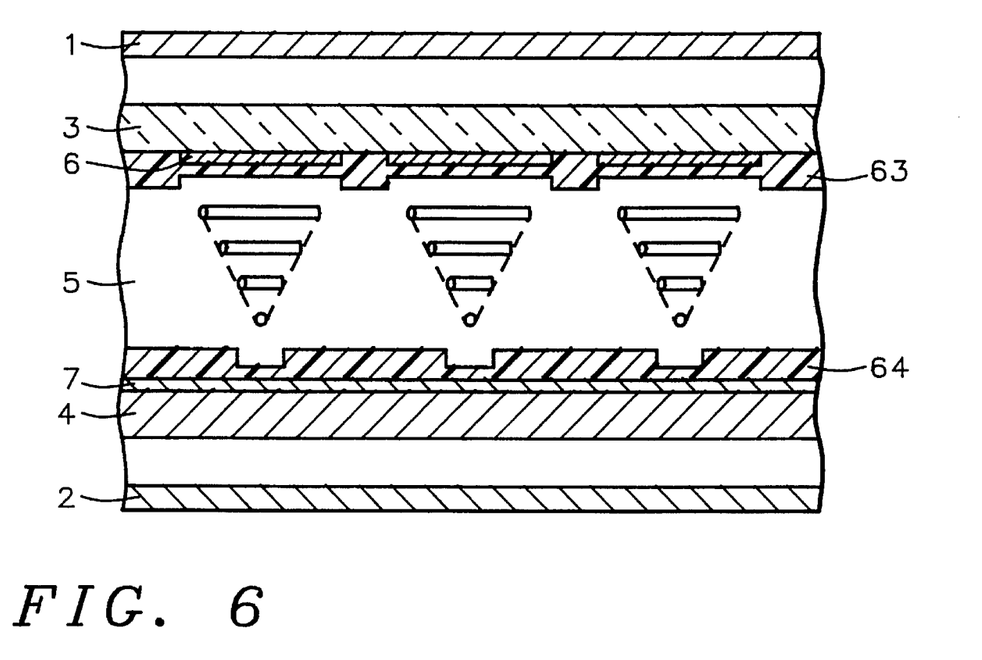
FIG. 6 is a schematic cross-sectional view of a Liquid Crystal Display incorporating the features of the present invention, including orientation surfaces.

In a first embodiment of the present invention, patterns of concentric annuli 21 as illustrated in FIG. 2, are formed in the lower orientation layer (64 in FIG. 6). In the corresponding areas in the upper orientation layer (63 in FIG. 6) patterns in the shape of radial spokes, as illustrated by 31 in FIG. 3, are formed. One such pair of patterns is formed per pixel area (such as 22 in FIG. 2 and 32 in FIG. 3).

Our preferred method of forming said patterns is to first coat the substrates (3 and 4) and the transparent conducting lines (6 and 7) with a layer of polyimide to a thickness between about 0.1 and 10 microns. The required patterns are then transferred to a layer of photoresist and the unprotected polyimide is removed by either conventional wet etching or reactive ion etching. Although this is our preferred method for forming the orientation patterns, it also possible to etch said orienation patterns directly into the glass substrates, without reducing the effectiveness of the invention.

Continuing our description of the first embodiment, for the pattern of concentric annuli the widths of said annuli and the spacings between them are caused to be essentially the same, having values in the range from about 0.1 to 100 microns, depending on the resolution of the display. In a typical implementation of the present invention the number of concentric annuli per pattern (per pixel) would be between 10 and 100.

The radial spokes are, by definition, always at right angles to the concentric annuli, thereby guaranteeing that the molecules will be given the correct amount of twist. Additionally, and key to the present invention, initial orientations of the liquid crystal molecules will cover a wide range. In a typical implementation of the present invention, the number of radial spokes per pattern (per pixel) would be between 1 and 100. A schematic cross-sectional view of the invention is shown in FIG. 6. Most of the parts are as already discussed for FIG. 1a, and are therefore identically labelled as in FIG. 1a. Additionally, the concentric annuli patterns 63 (one per pixel area) and the radial spokes patterns 64 (also one per pixel) are shown. It should be noted that the effectiveness of the present invention (including this embodiment and those to be described below) would not be affected if 64 represented the concentric annuli and 63 the radial spokes.

Figure 4:
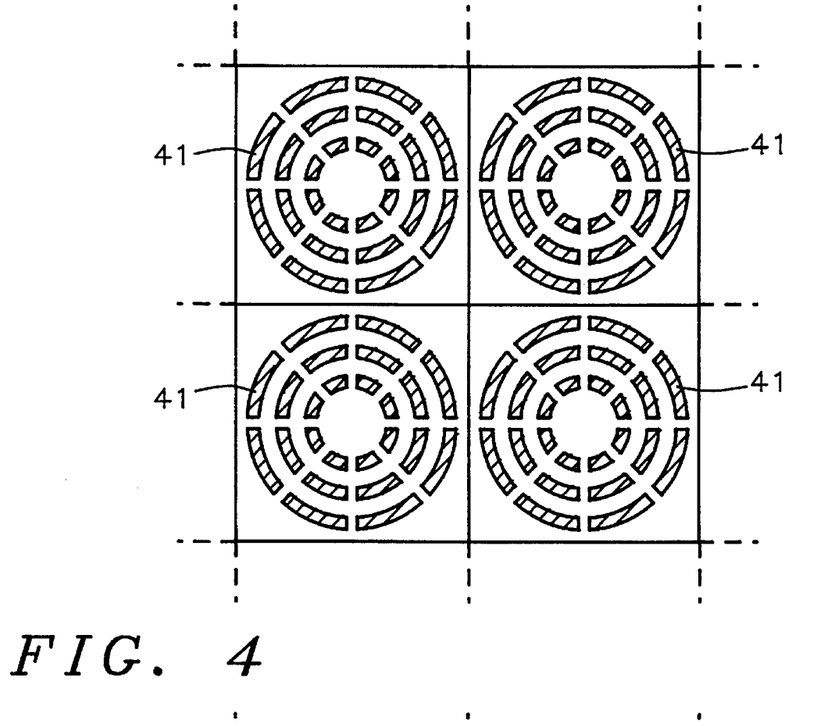
FIGS. 4 and 5 show the previous two patterns, formed from broken rather than continuous lines
Figure 5:
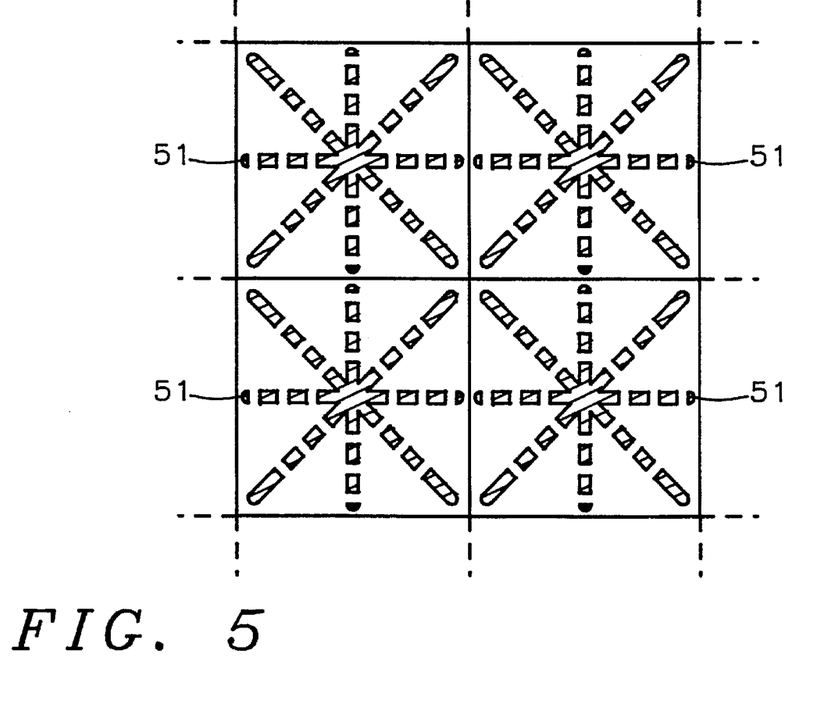

A second embodiment of the present invention involves the use of broken lines, rather than continuous ones, for the formation of the two types of pattern. These are illustrated by examples such as 41 in FIG. 4 for the concentric annuli and by examples such as 51 in FIG. 5 for the radial spokes patterns. As seen, each formerly continuous line is now made up of a series of separate segments. It will be intuitively understood that, as the ratio of segment lengths to the sizes of the spacings between the segments, decreases the fraction of the emerging light that is deflected away from the normal will similarly decrease. Thus the relative areas of the segments in broken line embodiments of the present invention may be used as a way to adjust the angular distribution of emergent light intensity.

Figure 7:
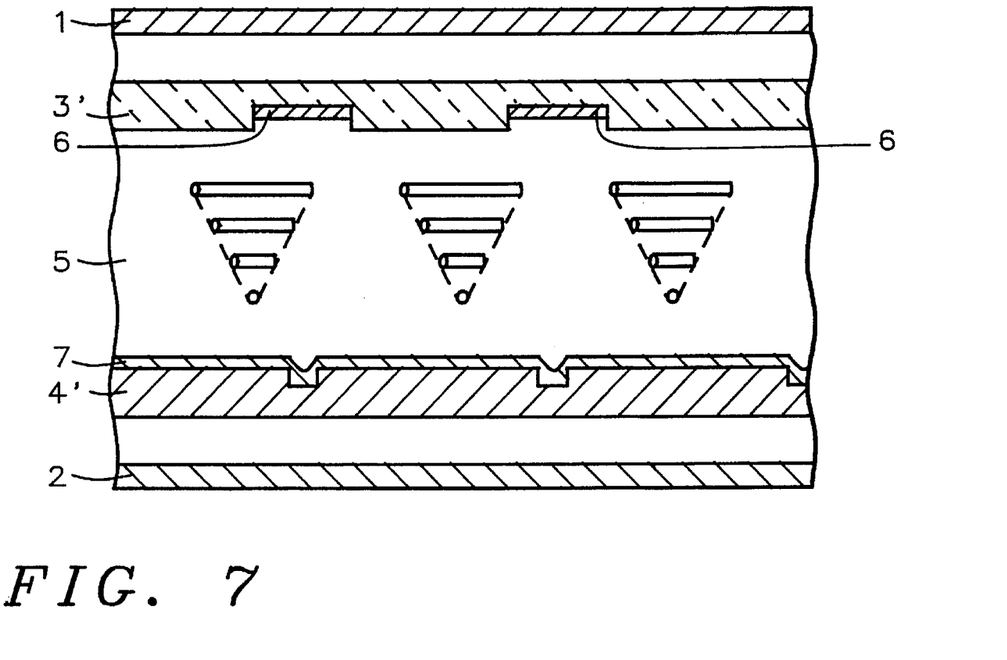
FIG. 7 is a schematic cross-sectional view of a Liquid Crystal Display incorporating the features of the present invention, without orientation surfaces.

FIG. 7 shows another embodiment of the present invention wherein the circular and radial patterns are etched into the surfaces of the glass substrate rather than into the orientation layers that overlay the substrate (as seen in, for example, FIG. 6). The advantage associated with this particular embodiment is lower manufacturing cost relative to the embodiment shown in FIG. 6.

Figure 8A:
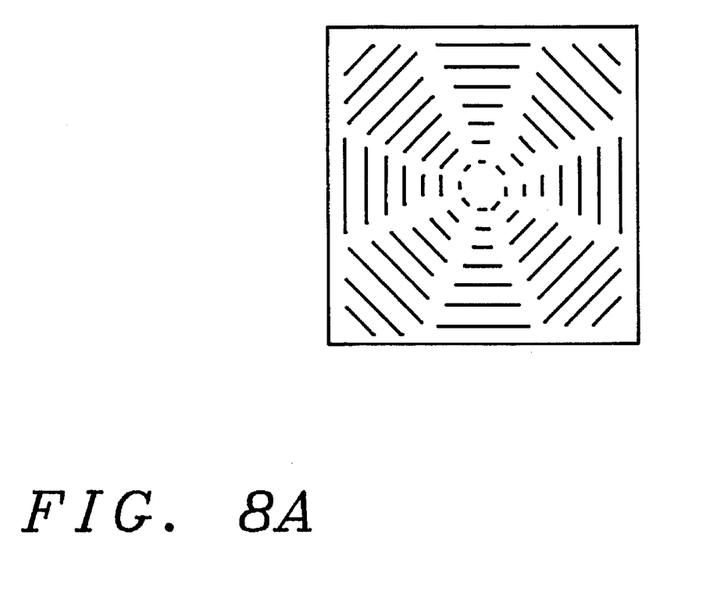
FIGS. 8a and 8b show patterns of concentric polygons and the corresponding radial spokes, respectively.
Figure 8B:
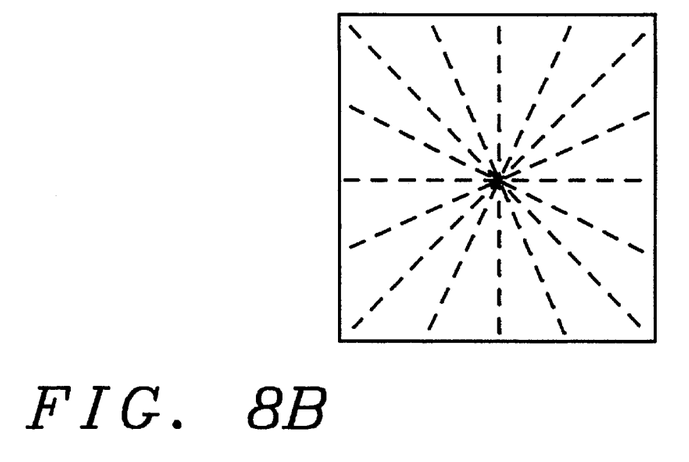
Figure 9A:
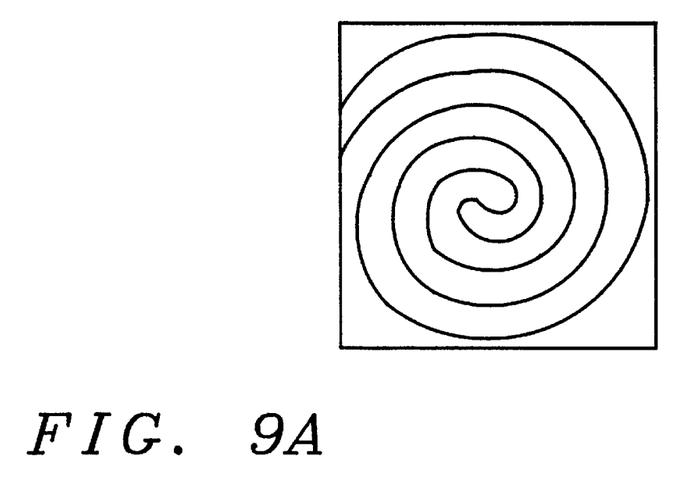
FIGS. 9a and 9b show a spiral pattern and the corresponding radial spokes, respectively.
Figure 9B:
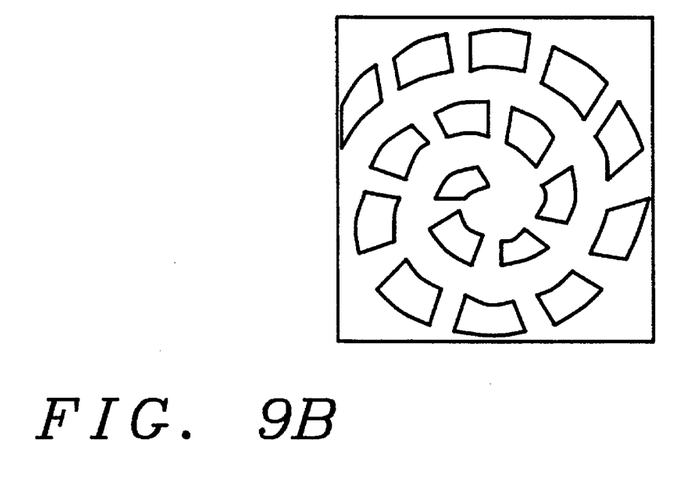

Those understanding the spirit of the present invention will be able imagine other, similar, embodiments that are variations on the embodiments described above. For example, concentric circles could be replaced by concentric polygons (see FIG. 8a), together with a set of segmented radial spokes (FIG. 8b). Yet another possibility would be to replace the concentric circles by a single continous spiral (see FIG. 9a) along with an appropriately segmented set of radial spokes (as shown in FIG. 9b). All such variations would achieve the same effect as that of the embodiments that have been described in detail.

In the foregoing discussion it was implied (though not explicitly stated) that the display was of the monochrome type, that is each pixel controlled the passage of light of the same color or color composition as all the other pixels. It will be understood by those skilled in the art that all of the above described embodiments (and their possible variations) would be equally effective when used in a display wherein different pixels control the passage of light of two or more different colors, as in most color displays already in existence today.

While the invention has been particularly shown and described with reference to the preferred embodiments thereof, it will be understood by those skilled in the art that various changes in form and details may be made without departing from the spirit and scope of the invention.

What is claimed is:

1. A liquid crystal display structure comprising:

an entrance polarizer;

first and second transparent insulating substrates, each having upper and lower surfaces;

a layer of liquid crystal between said first and second insulating substrates;

first parallel lines, regularly spaced, comprising transparent conductive material, on the lower surface of said insulating substrate;

a first orientation layer on said first parallel lines and said lower surface;

second parallel lines, regularly spaced, comprising transparent conductive material, on the upper surface of said second insulating substrate, orthogonal to said first parallel lines on the lower surface of said first insulating substrate, each area of overlap of parallel lines constituting a pixel of said display;

a second orientation layer on said second parallel lines and said upper surface;

a pattern of concentric annuli in said first orientation layer, one such pattern per pixel area;

a pattern of radial spokes in said second orientation layer, one such pattern per pixel area, wherein said patterns of concentric annuli and radial spokes comprise broken lines; and an exit polarizer.

2. The structure of claim 1 wherein said patterns of concentric annuli and radial spokes comprise trenches extending below the surfaces of said first and second orientation layers.

3. The structure of claim 1 wherein said patterns of concentric annuli and radial spokes comprise pedestals rising above the surfaces of said first and second orientation layers.

4. The structure of claim 1 wherein said first and second orientation layers comprise polyimide.

5. The structure of claim 1 wherein the widths of, and spacings between, said concentric annuli are the same for all of said concentric annuli and the widths of said concentric annuli are between about 0.1 and about 10 microns and the spacings between said concentric annuli are between about 0.1 and about 10 microns.

6. The structure of claim 1 wherein the number of concentric annuli in each pattern of concentric annuli is between about 10 and about 100.

7. The structure of claim 1 wherein the number of spokes in each pattern of radial spokes is between 1 and about 100.

8. The structure of claim 1 wherein the width of each annulus within each pattern of concentric annuli is between about 0.1 and about 100 microns.

9. The structure of claim 1 wherein the separation between concentric annuli is between about 0.1 and about 100 microns.

10. The structure of claim 1 wherein the width of each spoke within each pattern of radial spokes is between about 0.1 and about 10 microns.

11. The structure of claim 1 wherein the light from each pixel area passes through one of at least two different color filters, thereby providing a color display.

12. A method for manufacturing a liquid crystal display comprising:

providing entrance and exit polarizers;

providing first and second transparent insulating substrates, each having upper and lower surfaces;

depositing a first layer of transparent conductive material on the lower surface of said first insulating substrate then patterning and etching said layer to form first parallel lines, regularly spaced;

depositing a second layer of transparent conductive material on the upper surface of said second insulating substrate then patterning and etching said second layer to form second parallel lines, regularly spaced, orthogonal to the first; parallel lines on the first insulating substrate, the overlaps between first and second parallel lines constituting pixel areas;

coating said first parallel lines and said upper surface with a first orientation layer;

coating said second parallel lines and said lower surface with a second orientation layer;

forming a pattern of concentric annuli in said first orientation layer, one such pattern per pixel area;

forming a pattern of radial spokes in said, second orientation layer, one such pattern per pixel area, wherein said patterns of concentric annuli and radial spokes are formed by etching trenches into said first and second orientation layers respectively; and confining a layer of liquid crystal between said first and second insulating substrates.

13. The method of claim 12 wherein said first and second orientation layers comprise a coating of polyimide having a thickness between about 0.1 and about 10 microns.

14. A method for forming a liquid crystal display comprising:

providing entrance and exit polarizers;

providing first and second transparent insulating substrates, each having upper and lower surfaces;

depositing a first layer of transparent conductive material on the lower surface of said first insulating substrate then patterning and etching said layer to form parallel lines, regularly spaced;

depositing a second layer of transparent conductive material on the upper surface of said second insulating substrate then patterning and etching said second layer to form parallel lines, regularly spaced, orthogonal to the parallel lines on the first insulating substrate, the overlaps between parallel lines constituting pixel areas;

forming a pattern of concentric broken annuli on the upper surface of said first insulating substrate, one such pattern per pixel area;

forming a pattern of radial broken spokes on the lower surface of said second insulating substrate, one such pattern per pixel area; and confining a layer of liquid crystal between said first and second insulating substrates.

15. The method of claim 14 wherein the angular distribution of light emerging from said liquid crystal display is adjusted by varying the areas of said concentric annuli and said radial spokes.

16. A liquid crystal display structure comprising:

an entrance polarizer;

first and second transparent insulating substrates, each having upper and lower surfaces;

a layer of liquid crystal between said first and second insulating substrates;

first parallel lines, regularly spaced, comprising transparent conductive material, on the lower surface of said insulating substrate;

a first orientation layer on said first parallel lines and said lower surface;

second parallel lines, regularly spaced, comprising transparent conductive material, on the upper surface of said second insulating substrate, orthogonal to said first parallel lines on the lower surface of said first insulating substrate, each area of overlap of parallel lines constituting a pixel of said display;

a second orientation layer on said second parallel lines and said upper surface;

a pattern of concentric polygons in said first orientation layer, one such pattern per pixel area;

a pattern of radial spokes in said second orientation layer, one such pattern per pixel area, wherein said pattern of radial spokes comprises broken lines; and an exit polarizer.

17. A liquid crystal display structure comprising:

an entrance polarizer;

first and second transparent insulating substrates, each having upper and lower surfaces;

a layer of liquid crystal between said first and second insulating substrates;

first parallel lines, regularly spaced, comprising transparent conductive material, on the lower surface of said first insulating substrate;

a first orientation layer on said first parallel lines and said lower surface;

second parallel lines, regularly spaced, comprising transparent conductive material, on the upper surface of said second insulating substrate, orthogonal to said parallel lines on the lower surface of said first insulating substrate, each area of overlap of parallel lines constituting a pixel of said display;

a second orientation layer on said second parallel lines and said upper surface;

a spiral pattern in said first orientation layer, one such pattern per pixel area;

a pattern of segmented radial spokes in said second orientation layer, one such pattern per pixel area; and an exit polarizer.

18. A liquid crystal display structure comprising:

an entrance polarizer;

first and second transparent insulating substrates, each having upper and lower surfaces;

a layer of liquid crystal between said first and second insulating substrates;

first parallel lines, regularly spaced, comprising transparent conductive material, on the lower surface of said insulating substrate;

second parallel lines, regularly spaced, comprising transparent conductive material, on the upper surface of said second insulating substrate, orthogonal to said first parallel lines on the lower surface of said first insulating substrate, each area of overlap of parallel lines constituting a pixel of said display;

a pattern of concentric geometrical forms in the lower surface of said first substrate, one such pattern per pixel area;

a pattern of radial spokes in the upper surface of said second substrate, one such pattern per pixel area, wherein said pattern of concentric geometrical forms and said pattern of radial spokes are segmented; and an exit polarizer.

19. The structure of claim 18 wherein said concentric geometrical forms comprise concentric annuli.

20. The structure of claim 18 wherein said concentric geometrical forms comprise concentric polygons.

21. A liquid crystal display structure comprising:

an entrance polarizer;

first and second transparent insulating substrates, each having upper and lower surfaces;

a layer of liquid crystal between said first and second insulating substrates;

first parallel lines, regularly spaced, comprising transparent conductive material, on the lower surface of said insulating substrate;

second parallel lines, regularly spaced, comprising transparent conductive material, on the upper surface of said second insulating substrate, orthogonal to said first parallel lines on the lower surface of said first insulating substrate, each area of overlap of parallel lines constituting a pixel of said display;

a pattern of concentric spirals in the lower surface of said first substrate, one such pattern per pixel area;

a pattern of radial spokes in the upper surface of said second substrate, one such pattern per pixel area; and an exit polarizer.

* * * * *